United States Patent [19]

Fernandopulle

[11] 4,230,531
[45] Oct. 28, 1980

[54] WIND POWERED SOLAR STILL

[76] Inventor: Placidus D. Fernandopulle, 17 Rue de Gerardmer, 68000 Colmar, France

[21] Appl. No.: 880,125

[22] Filed: Feb. 22, 1978

[30] Foreign Application Priority Data

Mar. 3, 1977 [GB] United Kingdom ............... 9028/77

[51] Int. Cl.² ................ B01D 3/00; C02B 1/06; F24J 3/02
[52] U.S. Cl. .................. 202/180; 202/233; 202/234; 202/235; 60/398; 60/648; 203/3; 203/10; 203/99; 203/100; 203/DIG. 1; 203/DIG. 16; 203/DIG. 20; 203/DIG. 25; 290/1 R; 290/55; 417/334
[58] Field of Search .............. 203/DIG. 1, 10, 11, 203/DIG. 16, 100, 49, 99, 22, DIG. 17, 3; 202/234, 235, 180, 233; 159/1 G, 1 S; 417/334; 60/648, 641, 398; 290/55, 44, 1 R

[56] References Cited

U.S. PATENT DOCUMENTS

| 287,909 | 11/1883 | Cook | 159/1 G |
|---|---|---|---|
| 554,138 | 2/1896 | Negbaur et al. | 290/55 |
| 983,424 | 2/1911 | Brosius | 203/DIG. 1 |
| 1,302,363 | 4/1919 | Graham | 203/DIG. 1 |
| 1,862,224 | 6/1932 | Langley | 159/1 G |
| 2,332,294 | 10/1943 | Bohmfalk | 159/1 G |
| 3,344,042 | 9/1967 | Hardesty | 203/100 |
| 3,436,908 | 4/1969 | Van Delic | 203/DIG. 1 |
| 3,527,676 | 9/1970 | Hingst et al. | 203/3 |
| 3,661,424 | 5/1972 | Jacoby | 159/1 G |
| 3,775,257 | 11/1973 | Lovrich | 203/DIG. 1 |
| 3,824,156 | 7/1974 | Griffin | 203/100 |
| 3,871,180 | 3/1975 | Swanson | 203/100 |
| 3,928,145 | 12/1975 | Othmer | 203/DIG. 1 |
| 4,062,735 | 12/1977 | Kopp | 159/1 G |
| 4,091,623 | 5/1978 | Edmondson | 203/100 |

Primary Examiner—Wilbur L. Bascomb, Jr.
Attorney, Agent, or Firm—Diller, Ramik, Wight

[57] ABSTRACT

Apparatus comprising a solar still and a wind powered generator. Sea water is preheated in a condenser and is supplied to the still where it is heated further either by solar radiation, or by a heated pipe containing brine, or both. The still supplies warm humid air and vapor to the condenser to provide a distilled water condensate, which condensate is supplemented by water collected from the sloping parts of the still roof. The brine in the heated pipe in the still is supplied from a brine pit which is heated by electrodes connected to the wind powered generator. The generator also charges batteries and supplies electrical power to brine pumps and to a ventilator in the still.

13 Claims, 2 Drawing Figures

WIND POWERED SOLAR STILL

FIELD OF INVENTION

This invention relates to apparatus comprising a solar still and a wind powered generator.

PRIOR ART

Techniques and apparatus are known, for example, from U.K. Pat. No. 731997 and 737909 for obtaining drinkable water from the sea. While such known means may incorporate a wind powered generator to supplement the energy provided by solar radiation there is the disadvantage that the distilled water output is severely reduced in the absence of sunlight and this may be unacceptable in certain situations or arid regions where it is desirable to provide potable or drinkable water over reasonably long periods.

SUMMARY OF INVENTION

An object of the present invention is to prolong the operation of a solar still beyond a normal daylight period during which solar energy is available.

The present invention comprises a solar still, means for electrically heating and storing brine, condenser and heat exchanger means, and a wind powered electrical generator including means for storing the electrical output of said generator; said still being provided with brine from said condenser and heat exchanger means, said brine being heated in said still either by solar radiation, or by pipe means connected to said means for electrically heating and storing brine, or by both, the humid air and vapour produced by said still being supplied to said condenser and heat exchanger means where it condenses to provide a distilled water output, said means for electrically heating and storing brine being charged with brine from said still, and said pipe means having an exit for discharging waste brine.

Preferably, said distilled water output is supplemented by means for collecting condensed distilled water from a roof of said still.

The means for electrically heating and storing brine may be a brine pit which is provided with electrodes for heating said brine, said electrodes being powered by said electrical generator or by said means for storing the electrical output thereof.

The inlet means for cold salt water may comprise a bore hole on a site adjacent the coast, the bore hole helping to avoid the construction of a decanter to eliminate silt and organic matter.

Other aspects and objects of the invention will become apparent from the following description, taken in conjunction with the accompanying drawings.

DESCRIPTION OF PREFERRED EMBODIMENT

Figure 1:
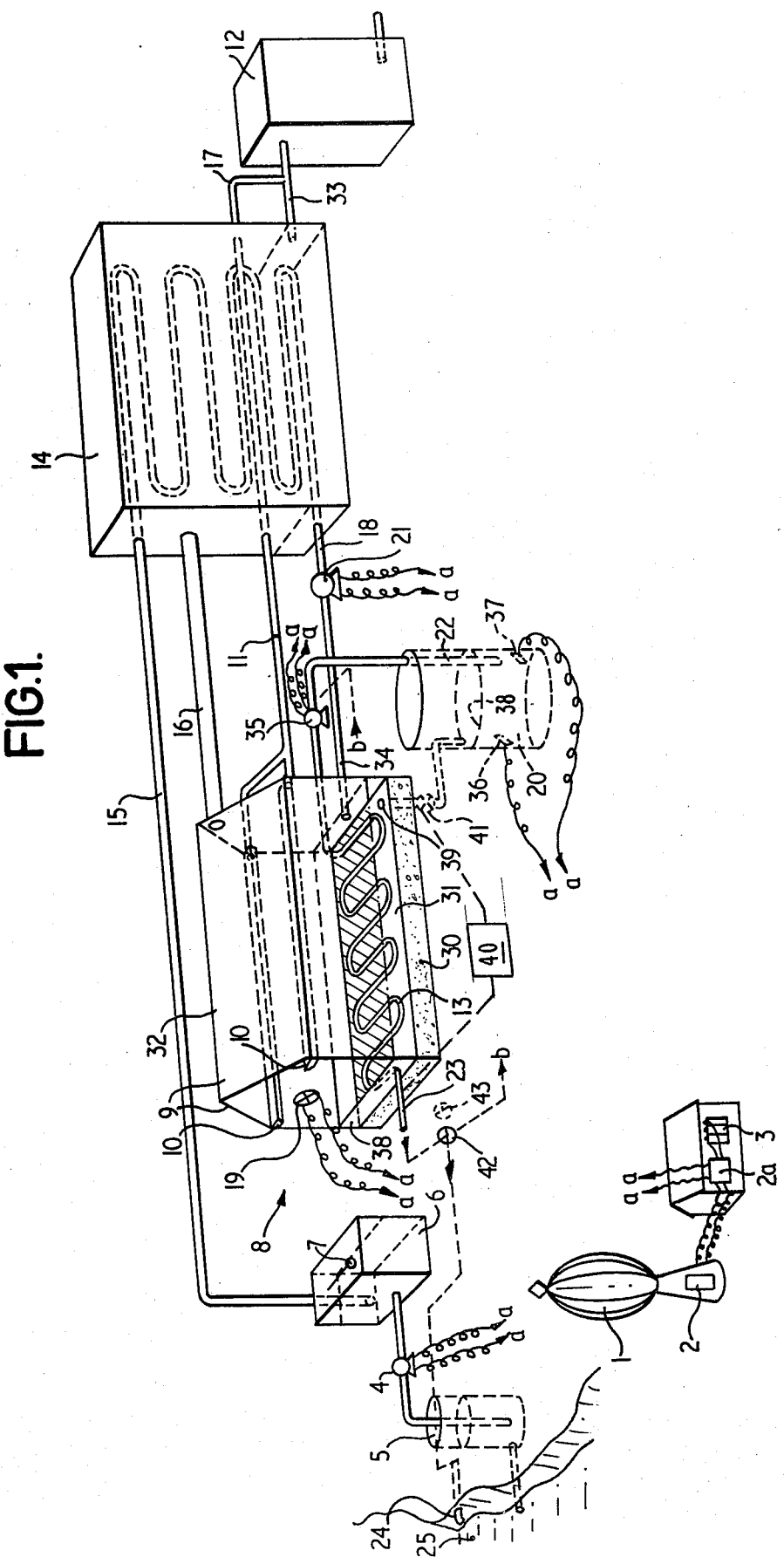
FIG. 1 is a schematic pictorial representation of apparatus according to the present invention.

Referring to the drawings, a site is chosen near the coast for installing apparatus according to the invention. A wind powered generator of known construction (for example, of the Darrius or Windflo type) comprising a turbine 1 which rotates about a vertical axis, drives a known generator 2 to produce electricity for storage in conventional batteries 3. The construction and operation of such a wind powered generator is well known and therefore only a brief description is given. An electrical pump 4 connected to the electrical power source 2, 3 pumps salt water from a bore hole 5 adjacent a site on the coast. The bore hole 5 helps to avoid the construction of a decanter to eliminate silt and organic matter from sea water having a level indicated by reference 25. Pump 4 supplies a storage tank 6, the pumping being automatically controlled, in a known manner, by the water level sensed by a float 7 at a predetermined reference level in the storage tank 6. When the pump 4 is not energised, surplus electricity produced by the wind generator 1 is stored in the batteries 3. A control panel 2a, of known construction, provides the necessary control for charging the batteries 3 and for operating pump 4 (and other pumps as described below). The panel 2a is connected to pump 4 (and to other electrically operated components described below) by wires or a cable indicated by the references aa. Again, the construction and operation of panel 2a for such automatic control of the pumps and other components and for the charging of batteries 3 is well known in the art and requires no detailed explanation.

A solar still generally indicated by reference numeral 8, comprises one or more solar panels 9, of known construction, and a concrete support 30, the upper surface 31 of which is lined with asphalt or a suitable plastics material which acts as a good black body absorber. The lower sides of the solar still 8, together with its floor or support 30, form a trough (unnumbered) in which a shallow depth of salt water is received from the outlet of pipe 34. The still 8 has a roof 32 with sloping portions made of transparent material such as plastics, fibre glass, or glass for transmitting solar radiation to the interior. An end wall of the still, which normally supports a ventilator 19, has not been drawn in so as to show more clearly a pair of troughs or side canals 10 (several of which may be employed in practice). It will be appreciated, that the still 8 is drawn only diagrammatically, or as if it were transparent, so as to better illustrate its contents. The evaporation of salt water within still 8 results in a condensation of droplets on the sloping parts 9 of roof 32 and the condensate is collected in the troughs or side canals 10 having outlets connected to a pipe 11 which enters a condenser 14 and is connected to a pipe 17 and a distilled water storage tank 12. The still 8 also contains a pipe 13, made of copper or galvanised material, which is fixed to the floor of the still and is laid in a serpentine path so as to cover a large surface area. Pipe 13 is provided for conducting heated brine from a pit 20, through the still 8 to exit from a pipe 23 which is connected to a discharge pipe 24 over the sea 25.

The condenser and heat exchanger unit 14 receives cold salt water from an inlet pipe 15 which is connected to the sea water storage tank 6. Unit 14 also receives the humid air and water vapour from still 8 via duct 16. The cold salt water flowing through pipe 15 is preheated by the output of duct 16 (FIG. 1) whereby the humid air and vapour condenses to form a distilled water condensate at the bottom of unit 14 which is extracted by pipe 33 for storage in tank 12. The preheated salt water exits from unit 14 via a pipe 18 which is connected to a pump 21 and to a pipe 34 for replenishing the solar still 8. Pump 21 has leads aa for connection to the panel 2a. The ventilator 19, in the end wall (not shown) of the still 8, enables the evacuation of water vapour and humid air via duct 16. The ventilator 19 is dimensioned so as to enable sufficient air and vapour to be evacuated at a constant rate through duct 16. This increases the amount of water production per solar panel or unit of still 8 and the efficiency of the heat balance. It will be appreciated that the still 8 has been drawn diagrammatically with regard to the area of the black body solar energy absorbing surface 31, and that a plurality of known solar heating panels or units may be employed in practice as long as they or their contents are heated by the brine pipe 13. The ventilator 19 is electrically operated and is connected by wires or a cable to the panel 2a as indicated by the references aa.

The brine pipe heating system comprises the reservoir or brine pit 20 connected to the serpentine pipe 13 by means of a pump 35 and a dip tube 22. When pump 35 is energised, the brine stored in pit 20 is withdrawn through tube 22 and enters pipe 13 before it exits at pipe 23 which is connected to a blow out or discharge pipe 24 adjacent sea level 25. The brine in pit 20 is heated by conduction therethrough via electrodes 36, 37. The sea water 38 in still 8, which is supported by the blackened surface 31, is heated by solar energy and evaporation takes place. The brine which is cooled by such evaporation flows down a drain 39 at a lowermost point of the still 8 through a pipe 40 and into the pit 20. There, it is heated electrically before being extracted by pump 35 through the dip tube 22. The heating of the brine in pit 20 is effected by the power stored in batteries 3. Under normal conditions, production of distilled water in the still 8 during the daytime will occur over a period of from 6 to 8 hours. However, by using the power stored in batteries 3, the production of distilled water may continue, for example, for at least another 6 hours, due to heating the brine in pit 20. The evacuation of waste and concentrated brine from pipe 23 is controlled by a salinometer (not shown) of known construction, or by conventional means 40 responsive to a predetermined brine reference level also of known construction.

The salinometer or salinograph (not shown) is of known construction and provides an indication (e.g. a graph) or an output signal representing the amount of brine concentration. This amount is detected by a sensing element (not shown) located in the sea water in still 8. When a predetermined brine concentration is detected, valve 41 is opened and closed either manually by an operator responding to the indicated amount, or automatically by a known servomechanism (not shown), to remove brine of the required concentration to pit 20. When a predetermined liquid level has been reached in pit 20, for example, when it is full of brine at the predetermined concentration, the surplus brine is removed by pump 35, pipe 13, outlet 23 and is discharged from the blow-out pipe 24. This process is primarily accomplished when the still has just started to function namely, during the day-time.

During the night, the temperature of the concentrated brine in pit 20 is kept at a certain desired level by resistance heating. Whilst the sea water continues to flow into still 8 via pump 21, which can be either manually or automatically controlled with regard to the required level of sea water in still 8, the heated brine is removed from pit 20 and flows through pipe 13 to cause evaporation of the sea water in still 8. A 3-way valve 42 is either manually or automatically operated with respect to the temperature of the brine in pit 20, either to return warm brine to pump 35 (see broken lines 43) via connections bb (shown in the broken line), or to discharge brine from the blow-out 24 (see 42 as shown), The cold brine discharged from the blow-out 24 is replaced by more concentrated brine from still 8 supplied to pit 20 by pipe 39 and valve 41.

When the electrodes 36, 37 are connected to batteries 3, resistance heating takes place and the temperature attained by the brine will depend upon the battery power, heat loss, volume of brine to be heated and other factors. A temperature of 130° to 150° C. is practical. The pump 21 operates at sundown, either manually or automatically (for example, by means of photocells—not shown, but again of known construction and used in conjunction with known control circuitry) after the brine has been heated in the pit 20. Preferably brine is circulated at least once through the still 8 and pit 20 before discharge from pipe 23 and blow out pipe 24.

Figure 2:
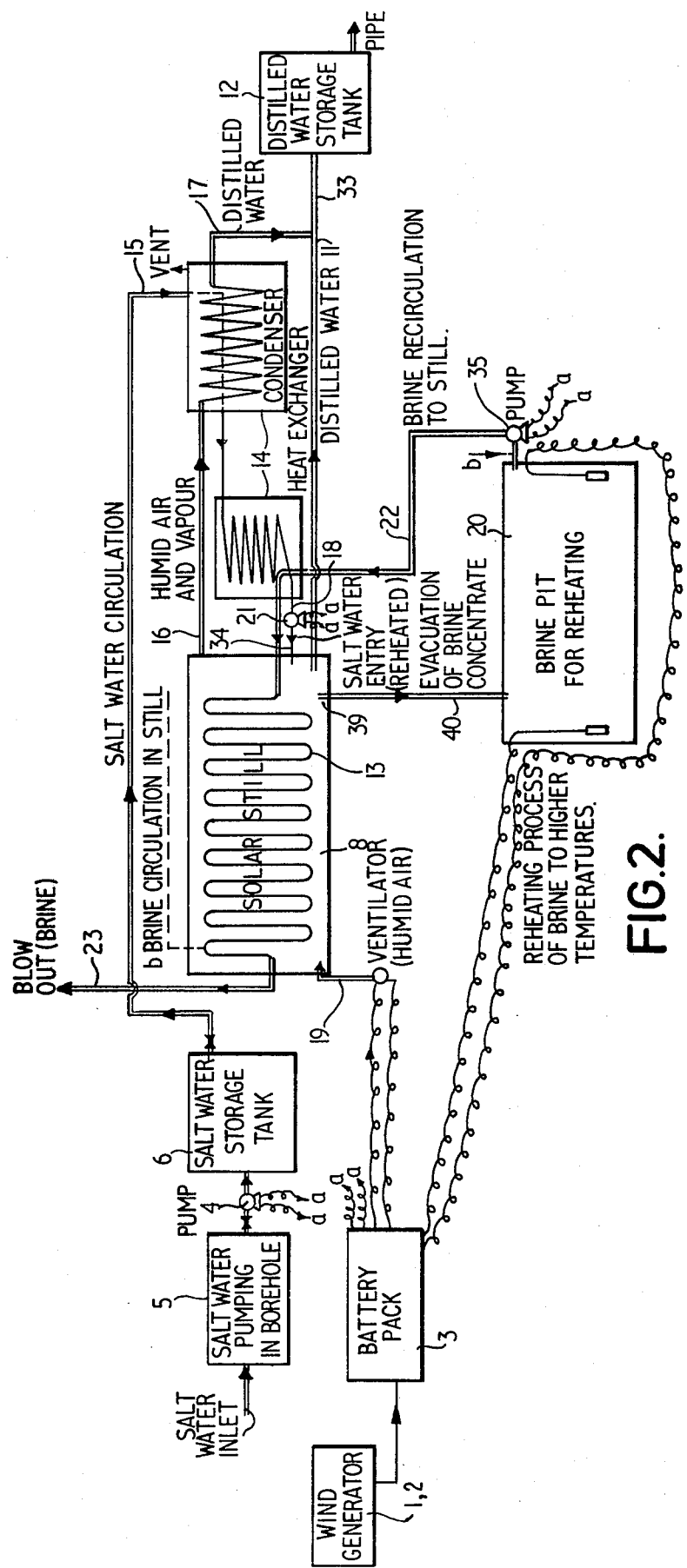
FIG. 2 is a block flow diagram of apparatus according to the invention.

The block diagram of FIG. 2 schematically illustrates the working principles in the apparatus of FIG. 1, although the condenser 14 is shown in two parts by way of an alternative embodiment. One of the parts of the condenser cools the vapour from the still 8 which is conducted through the duct 16. This provides some heating of the cold salt water inlet from pipe 15, which is further heated in the other part of the condenser through which tube 22 extends for conducting heated brine to the heat exchanger pipe 13 in the trough in the floor of still 8. Clearly, the actual construction of the units or components used in the apparatus according to the invention may vary from those schematically illustrated and described above. Moreover, modifications are envisaged whereby, for example, it is possible to use the condenser/heat exchanger unit 14 during the night to condense more water, for example, by using the heated brine in pit 20 and by using a sea water input of different temperatures.

In one practical example of the apparatus according to the invention, which provides a small water supply, the area of still 8 assures 80 to 100 liters of water for one hour of sunshine with an average daily temperature of 75° F. and solar radiation of about 2500 btu/sq.ft./day. The purpose is to attain, if possible, one cubic meter of water during the daytime. The battery power necessary to work the system and the capacity of the brine pit is selected to assure 6 to 8 hours of operation after sundown, or operation throughout the night (with automatic control). With 6 to 8 hours of night-time production, the plant should yield 2 cubic meters per day and when operated throughout the night (with automatic control) 3 to 4 cubic meters per day. This yield is for a small plant with, for example, 1000 to 1500 square meters of solar still. One purpose of the design is to attain a high efficiency of solar still unit production thereby avoiding a large still surface.

A general rule of thumb for design could be one liter of production for one square meter of still per 6 hours of sunshine.

In the case of colder climates where the duration of sunshine is limited, particularly in the winter, the system may incorporate a parabolic sun-orientated collector/mirror to make more efficient use of a few hours of sunshine, or it may be possible to heat the sea water entirely with energy derived from the wind generator (especially on a windy sunless day). However, a larger powered installation, for example, brine heater capacity, may then be required.

Whilst in the preferred embodiment, the electrodes 31, 36 are connected to the batteries 3 for heating the brine after sundown, a control system could be incorporated whereby the sea water 38 in still 8 receives heat both from solar energy as well as from the brine pit 20.

Other modifications may be possible within the spirit of the invention, the scope of the invention being defined by the following claims.

What is claimed is:

1. Apparatus for producing distilled or potable water from salt water, the apparatus comprising:

inlet means for cold salt water;

condenser means having walls defining a chamber which contains first heat exchanger means, said first heat exchanger means being connected to said inlet means and having an outlet from said chamber;

solar still means, said still means having wall means defining a trough and also being capable of transmitting solar energy thereto, said trough receiving salt water from the outlet of said chamber which is evaporated in said still means and collected as a water condensate on said wall means, said still means also being provided with water condensate collecting means for collecting the condensate on said wall means;

means for conducting water vapour from said still means to said chamber of said condenser means;

brine storage means for receiving brine from said trough consequent to said evaporation, said brine storage means having electrical heating means for heating brine therein;

second heat exchanger means for heating the salt water in said trough;

means for withdrawing heated brine from said brine storage means and for passing same through said second heat exchanger means;

wind-powered electricity generating means;

electricity storage means for storing the output of said wind-powered electricity generating means, said electrical heating means being connected to said electricity storage means; and means for collecting water condensate from said condenser means and the water condensate from said collecting means in said still.

2. Apparatus according to claim 1 including means for extracting air and vapour from said still means to the atmosphere.

3. Apparatus according to claim 1 wherein said heating means, in said brine storage means, comprises a pair of spaced electrodes whereby said brine is heated resistively.

4. Apparatus according to claim 5 including valve means provided between said through and said brine storage means for controlling the flow of brine to said brine storage means.

5. Apparatus according to claim 4 including means responsive to brine concentration for automatically controlling said valve means.

6. Apparatus for producing distilled or potable water from salt water, the apparatus comprising:

inlet means for cold salt water;

condenser means having walls defining a chamber which contains first heat exchanger means, said first heat exchanger means being connected to said inlet means and having an outlet from said chamber;

solar still means, said still means having wall means defining a trough and also being capable of transmitting solar energy thereto, said trough receiving salt water from the outlet of said chamber which is evaporated in said still means and collected as a water condensate on said wall means, said still means also being provided with water condensate collecting means for collecting the condensate on said wall means;

means for extracting air and vapour from said still means to the atmosphere;

means for conducting water vapour from said still means to said chamber of said condenser means;

brine storage means for receiving brine from said trough consequent to said evaporation, said brine storage means having a pair of spaced electrodes for resistively heating brine therein;

valve means provided between said trough and said brine storage means for controlling the flow of brine to said brine storage means;

means responsive to brine concentration for automatically controlling said valve means;

second heat exchanger means for heating the salt water in said trough;

means for withdrawing heated brine from said brine storage means and for passing same through said second heat exchanger means;

wind-powered electricity generating means;

electricity storage means for storing the output of said wind-powered electricity generating means, said spaced electrodes being connected to said electricity storage means; and means for collecting water condensate from said condenser means and the water condensate from said collecting means in said still.

7. Apparatus for producing distilled water from salt water comprising solar still means for evaporating salt water to form condensate therefrom, said solar still means including means for supporting a body of salt water and wall means for transmitting solar energy therethrough whereby at least a portion of the salt water body is evaporated forming water vapour which condenses upon said wall means as a condensate, means for conducting the condensate to condensate storing means, condenser means for forming further condensate from water vapour, condenser means including a condenser chamber having therein first heat exchanger means, means for introducing salt water into said first heat exchanger means, means for conducting salt water from an outlet of said first heat exchanger means to said solar still means to form the salt water body, means for conducting water vapour from said solar still into said condenser chamber whereby the latter-mentioned water vapour is condensed by said first heat exchanger means to form the further condensate, means for conducting salt water from said solar still means to salt water storing means, means for heating the stored salt water, second heat exchanger means for heating the salt water body, means for conducting heated salt water from said salt water storing means through said second heat exchanger means thereby heating the salt water body and in part forming the first-mentioned condensate, means for converting wind power into electrical energy, means for storing said electrical energy, and means for utilizing the stored electrical energy to energize said heating means.

8. The apparatus as defined in claim 7 including trough means associated with said wall means for receiving the first-mentioned condensate prior to the conduction thereof by said conducting means to said condensate storing means.

9. The apparatus as defined in claim 7 including means responsive to the concentration of the salt water departing said second heat exchanger means for controlling the flow of salt water from said solar still means to said salt water storing means.

10. The apparatus as defined in claim 7 including valve means for selectively conducting the salt water departing said second heat exchanger means to said heated salt water conducting means for subsequent recycling through said second heat exchanger means.

11. The apparatus as defined in claim 8 including valve means for selectively conducting the salt water departing said second heat exchanger means to said heated salt water conducting means for subsequent recycling through said second heat exchanger means.

12. The apparatus as defined in claim 9 including valve means for selectively conducting the salt water departing said second heat exchanger means to said heated salt water conducting means for subsequent recycling through said second heat exchanger means.

13. The apparatus as defined in claim 12 including trough means associated with said wall means for receiving the first-mentioned condensate prior to the conduction thereof by said conducting means to said condensate storing means.

* * * * *